US012608282B2

(12) United States Patent
DeGraaf et al.

(10) Patent No.: US 12,608,282 B2
(45) Date of Patent: *Apr. 21, 2026

(54) BACKUP AND RESTORE OF RESOURCES LOCATED WITHIN A REMOTE OBJECT STORE

(71) Applicant: NetApp, Inc., San Jose, CA (US)

(72) Inventors: John Ethan DeGraaf, Cranberry Township, PA (US); Sangramsinh Pandurang Pawar, Bedford, MA (US); Rajesh Rajaraman, Acton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/731,624

(22) Filed: Jun. 3, 2024

(65) Prior Publication Data

US 2024/0320103 A1 Sep. 26, 2024

Related U.S. Application Data

(63) Continuation of application No. 17/713,040, filed on Apr. 4, 2022, now Pat. No. 12,001,294.

(60) Provisional application No. 63/253,982, filed on Oct. 8, 2021.

(51) Int. Cl.
| | |
|---|---|
| *G06F 11/14* | (2006.01) |
| *G06F 9/54* | (2006.01) |
| *G06F 11/1446* | (2026.01) |

(52) U.S. Cl.
CPC .......... *G06F 11/1464* (2013.01); *G06F 9/547* (2013.01); *G06F 11/1469* (2013.01); *G06F 2201/84* (2013.01)

(58) Field of Classification Search
CPC .. G06F 11/1464; G06F 9/547; G06F 11/1469; G06F 2201/84

USPC .......................................................... 707/652
See application file for complete search history.

(56) References Cited

U.S. PATENT DOCUMENTS

| | | | |
|---|---|---|---|
| 9,792,163 | B1 * | 10/2017 | Chrysanthakopoulos .................. G06F 3/0647 |
| 10,216,449 | B1 | 2/2019 | Li et al. |
| 10,860,433 | B1 * | 12/2020 | Lieberman ............ G06F 16/907 |
| 11,005,935 | B1 | 5/2021 | Littlefield et al. |
| 11,249,655 | B1 | 2/2022 | Chen et al. |
| 11,321,196 | B1 | 5/2022 | Kobayashi et al. |
| 12,001,294 | B2 | 6/2024 | DeGraaf et al. |

(Continued)

OTHER PUBLICATIONS

Azure SQL Database., "Automated Backups for Hyperscale Databases," 2023, 7 pages.

(Continued)

*Primary Examiner* — Cam Linh T Nguyen

(57) ABSTRACT

Techniques are provided for backing up and restoring a file system or storage virtual machine located within a remote object store. A specification is parsed to identify resources associated with and including a primary resource hosted within a remote object store and to identify REST API endpoints of the resources. GET operations targeting the REST API endpoints of the resources are performed to retrieve the resources and properties of the resources. A link relationship specification is parsed to identify links corresponding to dependencies amongst the resources. A backup of the primary resource is generated to include the resources, the properties of the resources, and dependency information derived from the links. The backup can be used to restore the primary resource to the remote object store in manner that preserves the dependencies amongst the resources.

20 Claims, 9 Drawing Sheets

(56)                    References Cited

U.S. PATENT DOCUMENTS

| | | | |
|---|---|---|---|
| 2010/0115332 A1 | 5/2010 | Zheng et al. | |
| 2015/0324217 A1 | 11/2015 | Shilmover et al. | |
| 2016/0127454 A1 | 5/2016 | Maheshwari et al. | |
| 2017/0031764 A1* | 2/2017 | Cradick | G06F 11/076 |
| 2017/0126614 A1* | 5/2017 | Sinha | H04L 51/02 |
| 2019/0171472 A1* | 6/2019 | Wyble | H04L 67/56 |
| 2019/0391739 A1 | 12/2019 | Mueller et al. | |
| 2020/0104220 A1* | 4/2020 | Ranjan | G06F 11/1464 |
| 2020/0409939 A1* | 12/2020 | Flanagan | G06F 16/2379 |
| 2021/0406129 A1 | 12/2021 | Zheng et al. | |
| 2022/0006829 A1* | 1/2022 | Nikam | H04L 63/1466 |
| 2023/0115438 A1 | 4/2023 | DeGraaf et al. | |
| 2023/0229568 A1 | 7/2023 | Naidu et al. | |

OTHER PUBLICATIONS

Cloudian., "VMware Backup: Three Approaches," retrieved from internet: https://cloudian.com/guides/vmware-storage/vmware-backup/. 6 pages.

Google Cloud., "Filestore Backups Emigration of File-based apps to Cloud," 2022, Retrieved from Internet: https://cloud.google.com/blog/products/storage-data-transfer/introducing-filestore-backups. 6 pages.

Google Cloud., "MySQL; Restore an Instance," 2022, 9 pages.

IDrive., "Backup VMware Virtual Machines," IDrive Cloud Backup, 2022, 9 pages.

IDrive., "VMware Restore using IDrive Cloud Backup Application," Idrive Backup, 2022, 7 pages.

Mazor S., Ontap S3 as a New Backup Destination for Enhanced Data Management, NetApp Cloud Backup, May 31, 2023, 4 pages.

Microsoft Hyper-V, overview of VM Backup, 12 pages.

Non-Final Office Action mailed on Sep. 22, 2023 for U.S. Appl. No. 17/713,040, filed Apr. 4, 2022, 11 pages.

Notice of Allowance mailed on Jan. 24, 2024 for U.S. Appl. No. 17/713,040, filed Apr. 4, 2022, 09 pages.

Objectivefs, Filesystem Backup, 2022. https://objectivefs.com/howto/filesystem-backup, 3 pages.

Unitrends., "Unitrends Backup Software," Effortless Backup and Cloud Disaster protection, 2023, 9 pages.

VMware., "Workload VM Backup Solutions" Google Cloud VMware Engine Documentation, Apr. 3, 2022, 4 pages.

What is Cloud File Storage? AWS., "Cloud File Storage," AWS, Apr. 3, 2022., 9 pages.

* cited by examiner

200

206(1)

202(1)

| BACKUP ORCHESTRATOR | 211 |

NODE

DATA STORAGE APPARATUS

212(1)

CLIENT

208(1)

NETWORK MODULE 214(1)

DISK MODULE 216(1)

DATA STORAGE NODE 210(1)

VOLUME

218(1)

236

REMOTE OBJECT STORE

FABRIC 204

212(n)

CLIENT

208(n)

202(n)

206(n)

DATA STORAGE APPARATUS

NETWORK MODULE 214(n)

DISK MODULE 216(n)

DATA STORAGE NODE 210(n)

VOLUME

218(n)

NODE

BACKUP ORCHESTRATOR 211

400

PARSE API SPECIFICATION OF REST APIS TO IDENTIFY RESOURCES AND REST API ENDPOINTS — 402

RETRIEVE IP ADDRESS AND CREDENTIALS FOR ACCESSING REMOTE OBJECT STORE — 404

PERFORM GET OPERATIONS TARGETING REST API ENDPOINTS TO RETRIEVE RESOURCES AND PROPERTIES OF RESOURCES — 406

— 408

ALL RESOURCES AND PROPERTIES RETRIEVED?

NO

YES

GENERATE BACKUP OF PRIMARY RESOURCES TO INCLUDE RESOURCES AND PROPERTIES — 410

REMOTE OBJECT STORE

504

CLUSTER
RESOURCE

506

STORAGE
VIRTUAL MACHINE
RESOURCE

508

NETWORK
INTERFACE
RESOURCE

510

FILE SYSTEM
RESOURCE

512

VOLUME
RESOURCE

514

AGGREGATE
RESOURCE

● ● ●

524

GET OPERATIONS

516

BACKUP ORCHESTRATOR

518

API
SPECIFICATION

522

LINK
RELATIONSHIP
SPECIFICATIONS

526

BACKUP

600

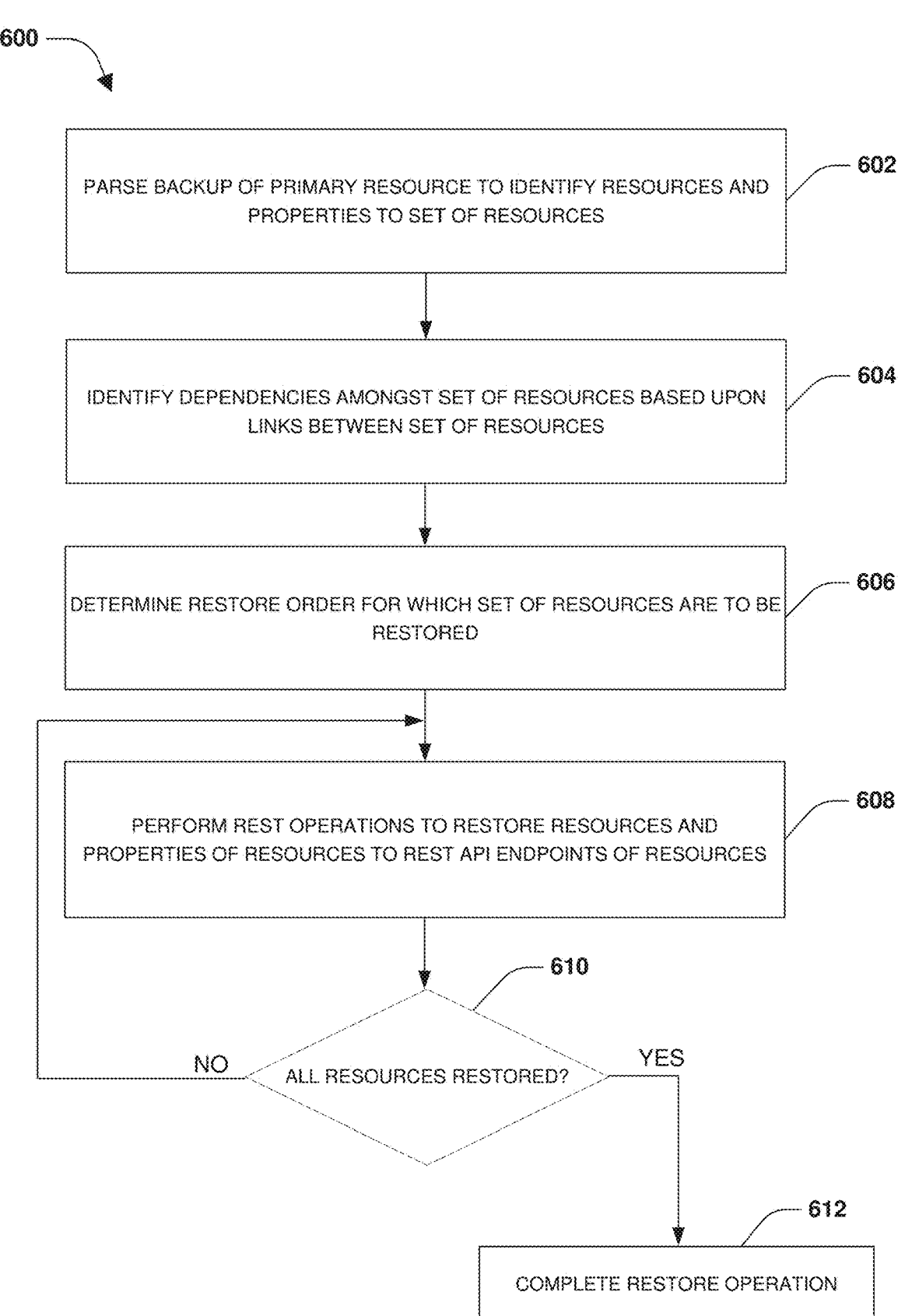

PARSE BACKUP OF PRIMARY RESOURCE TO IDENTIFY RESOURCES AND PROPERTIES TO SET OF RESOURCES — 602

IDENTIFY DEPENDENCIES AMONGST SET OF RESOURCES BASED UPON LINKS BETWEEN SET OF RESOURCES — 604

DETERMINE RESTORE ORDER FOR WHICH SET OF RESOURCES ARE TO BE RESTORED — 606

PERFORM REST OPERATIONS TO RESTORE RESOURCES AND PROPERTIES OF RESOURCES TO REST API ENDPOINTS OF RESOURCES — 608

610

NO      ALL RESOURCES RESTORED?      YES

COMPLETE RESTORE OPERATION — 612

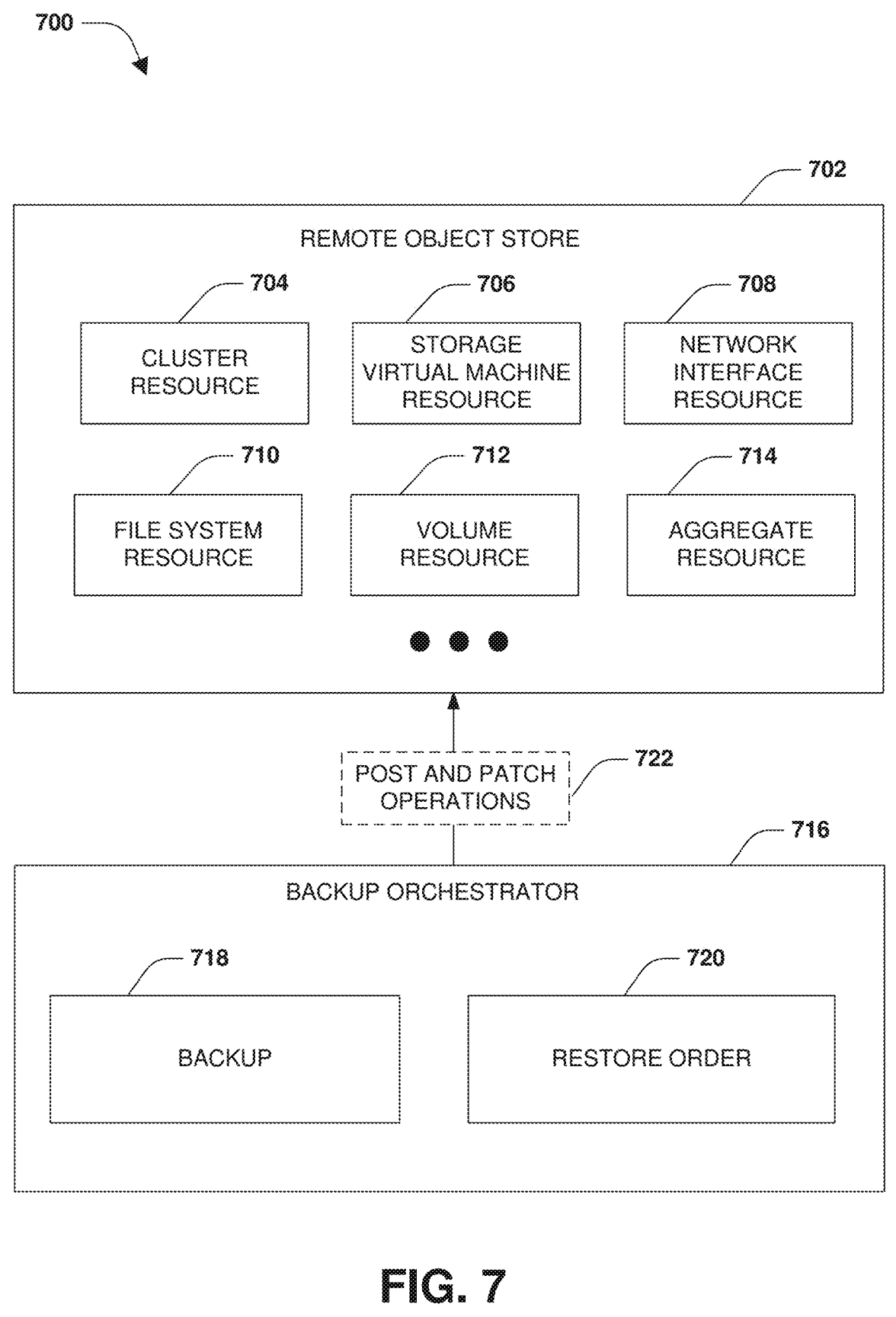

REMOTE OBJECT STORE

704
CLUSTER RESOURCE

706
STORAGE VIRTUAL MACHINE RESOURCE

708
NETWORK INTERFACE RESOURCE

710
FILE SYSTEM RESOURCE

712
VOLUME RESOURCE

714
AGGREGATE RESOURCE

● ● ●

722
POST AND PATCH OPERATIONS

716
BACKUP ORCHESTRATOR

718
BACKUP

720
RESTORE ORDER

FIG. 7

BACKUP AND RESTORE OF RESOURCES LOCATED WITHIN A REMOTE OBJECT STORE

CROSS-REFERENCE TO RELATED APPLICATIONS

This application claims priority to and is continuation of U.S. Patent Application, titled "BACKUP AND RESTORE OF RESOURCES LOCATED WITHIN A REMOTE OBJECT STORE", filed on Apr. 4, 2022 and accorded application Ser. No. 17/713,404, which claims priority to U.S. Provisional Patent Application, titled "BACKUP AND RESTORE OF RESOURCES LOCATED WITHIN A REMOTE OBJECT STORE", filed on Oct. 8, 2021 and accorded Application No. 63/253,982, which is incorporated herein by reference for all purposes.

TECHNICAL FIELD

Various embodiments of the present technology relate to backing up and restoring resources located within a remote object store. More specifically, some embodiments relate to backing up and restoring storage virtual machines, clusters, and/or file systems hosted within a remote object store.

BACKGROUND

A remote object store, such as a third-party cloud hyperscaler, can host a computing environment within which users can store data, host applications, and access services. The computing environment may comprise a cluster of nodes that provide storage services for users. For example, a volume may be mounted by a node for network file system (NFS) access by users. Another node may host a storage virtual machine configured to provide storage services for data stored within the volume. When a user stores data within the remote object store, the user may have an expectation that there is some level of data protection for resources hosted within the remote object store. Unfortunately, the remote object store may not provide a mechanism to create a backup of these resources, such as a backup of the storage virtual machine, the entire cluster of nodes hosting resources, and/or a file system hosted within the remote object store. Backing up these types of resources is difficult because of the dynamic nature of these resources and dependencies amongst the resources, such as where the storage virtual machine depends upon a security policy resource and an IP space resources in order to securely communicate over a network. A failure associated with hosting these resources will result in an interruption of service to clients accessing these resources. Additionally, data within the resources could become lost, corrupt, and/or unrecoverable because there is no backup that could be used to restore the lost or corrupt resources.

SUMMARY

Various embodiments of the present technology relate to backing up and restoring resources located within a remote object store (e.g., a third-party cloud hyperscaler). In some embodiments, a method executed by a data processing system is provided. As part of the method, a backup request to back up a primary resource of a plurality of resources of a computing environment within a third-party cloud hyperscaler is received. A set of resources of the plurality of resources are associated with the primary resource. A specification of representational state transfer application programing interfaces (REST APIs) mapped to the set of resources associated with the primary resource is parsed in order to identify REST API endpoints at which the set of resources can be accessed within the third-party cloud hyperscaler. An IP address and credentials for authenticating with the third-party cloud hyperscaler for accessing the resources is retrieved. The IP address and credentials are used to transmit GET operations to the third-party cloud hyperscaler. The GET operations target the REST API endpoints of the set of resources for retrieving the set of resources and properties of the set of resources from the third-party cloud hyperscaler. Hypertext application language (HAL) links embedded within the set of resources are evaluated to determine whether dependencies exist amongst the set of resources. A HAL link from a first resource to a second resource indicates that the first resource depends upon the second resource. In response to determining that the dependencies exist, a dependency graph is generated for the set of resources based upon the dependencies. A backup of the primary resource is created to include the set of resources, the properties of the resources, and the dependency graph. In response to receiving a restore request to restore the primary resource to the third-party cloud hyperscaler according to a state of the primary resource captured within the backup, the dependency graph is evaluated to create a restore order for restoring the set of resources and properties of the set of resources to the third-party cloud hyperscaler. The restore order indicates that the second resource is to be restored before the first resource based upon the first resource depending upon the second resource. The IP address and the credentials are utilized to transmit REST operations to the third-party cloud hyperscaler according to restore order. The REST operations restore the set of resources and properties of the set of resources to the third-party cloud hyperscaler according to restore order to create a restored primary resource.

In some embodiments, a method executed by a data processing system is provided. As part of the method, an application programming interface (API) specification of representational state transfer (REST) APIs is parsed to identify resources associated with and including a primary resource hosted within a remote object store and to identify REST API endpoints of the resources. The primary resource includes at least one of a storage virtual machine, a file system, or a portion of the storage virtual machine. An IP address and credentials for accessing the remote object store are retrieved. The IP address and credentials are used to transmit GET operations targeting the REST API endpoints of the resources to retrieve the resources and properties of the resources. Links within a link relationship specification are evaluated to identify dependencies among the resources. A backup of the primary resource is generated to include the resources and the properties. The resources are structured within the backup according to dependencies.

In some embodiments of the method, the link relationship specification is parsed to identify the links between the resources. A link from a first resource to a second resource indicates that the first resource has a dependency upon the second resource. The backup is populated with dependency information derived from the links. In some embodiments of the method, the dependency information is created as a dependency graph representing dependencies between the resources identified from the links.

In some embodiments of the method, the API specification is evaluated to identify supported REST operations for the resources. An indication is provided within the backup to indicate that a resource either supports a POST operation or a PATCH operation for restoring the resource.

In some embodiments of the method, a request to restore the primary resource is received. Accordingly, the backup is parsed to identify properties of a set of resources that include the primary resource and resources that reference or recursively depend from the primary resource. The primary resource is restored utilizing REST operations to restore the set of resources and the properties of the set of resources to REST API endpoints.

In some embodiments of the method, the link relationship specification is parsed to identify a resource that references the primary resource. In some embodiments of the method, the link relationship specification is parsed to identify a resource that recursively depends from the primary resource. In some embodiments of the method, the resources that reference or recursively depend from the primary resource are identified based upon the resources corresponding to REST API endpoints that are under the primary resource in a uniform resource identifier. In some embodiments of the method, the primary resource is recreated as a cloned instance of the primary resource at the remote object store, wherein the primary resource and the cloned instance of the primary resource are concurrently hosted within the remote object store. In some embodiments of the method, the primary resource is restored to a prior state represented by the backup.

In some embodiments of the method, in response to a resource of the set of resources supporting a POST operation, the resource is restored to a REST API endpoint using the POST operation. In response to the resource not supporting the POST operation, the resource is restored to the REST API endpoint using a PATCH operation.

In some embodiments of the method, the REST operations are performed in an order corresponding to a dependency order of the set of resources.

In some embodiments of the method, the REST operations are performed for resources that are defined in the API specification as not being read only and skipping resources that are defined in the API specification as being read only or lacking support for POST operations and PATCH operations.

In some embodiments, a non-transitory machine readable medium comprising instructions is provided. As part of a machine executing the instructions, a backup of a primary resource is parsed to identify properties of a set of resources that include the primary resource and resources that reference or recursively depend from the primary resource. A link relationship specification is parsed to identify links between the set of resources, wherein a link from a first resource to a second resource indicates that the first resource has a dependency upon the second resource. A restore order, derived from the links, for which the set of resources are to be restored is determined. The primary resource is restored utilizing REST operations, executed according to the restore order, to restore the set of resources and the properties of the set of resources to REST API endpoints.

In some embodiments of the machine executing the instructions, in response to determining that a resource of the set of resources is not to be restored, a local resource is substituted for the resource. The local resource is located at a destination where the primary resource is being restored.

In some embodiments of the machine executing the instructions, in response to the primary resource being a storage virtual machine, a determination is made that the resource is not to be restored based upon the resource being an aggregate. The local source is an existing resource at the destination.

In some embodiments of the machine executing the instructions, an identifier the local resource is identified utilizing a GET operation on a REST API endpoint for the local resource. A POST operation is performed for the primary resource, wherein the POST operation references the local resource using the identifier. In some embodiments of the machine executing the instructions, IP addresses are assigned to the set of resources that are different than IP addresses defined within the backup for the set of resources.

In some embodiments, a computing device is provided. The computing device comprises a memory including machine executable code and a processor coupled to the memory. As part of the computing device executing the machine executable code, an application programming interface (API) specification of representational state transfer (REST) APIs is parsed to identify resources associated with and including a primary resource hosted within a remote object store and to identify REST API endpoints of the resources. The primary resource includes at least one of a storage virtual machine, a file system, or a portion of the storage virtual machine. GET operations targeting the REST API endpoints of the resources are performed to retrieve the resources and properties of the resources. A link relationship specification is parsed to identify links between the resources, wherein a link from a first resource to a second resource indicates that the first resource has a dependency upon the second resource. A backup of the primary resource to include the resources, the properties of the resources, and a dependency order derived from the links.

In some embodiments of the computing device executing the machine executable code, in response to receiving a request to restore the primary resource, the backup is parsed to identify properties of a set of resources that include the primary resource and resources that reference or recursively depend from the primary resource. The primary resource is restored utilizing REST operations, executed according to the dependency order, to restore the resources and the properties of the resources to REST API endpoints.

DESCRIPTION OF THE DRAWINGS

FIG. 4 is a flow chart illustrating an example of a set of operations that can be used for backing up a resource located within a remote object store in accordance with an embodiment of the present technology.

FIG. 6 is a flow chart illustrating an example of a set of operations for restoring a resource located within a remote object store in accordance with an embodiment of the present technology.

FIG. 7 is a block diagram illustrating an example of restoring a resource located within a remote object store in accordance with an embodiment of the present technology.

DETAILED DESCRIPTION

Figure 1:
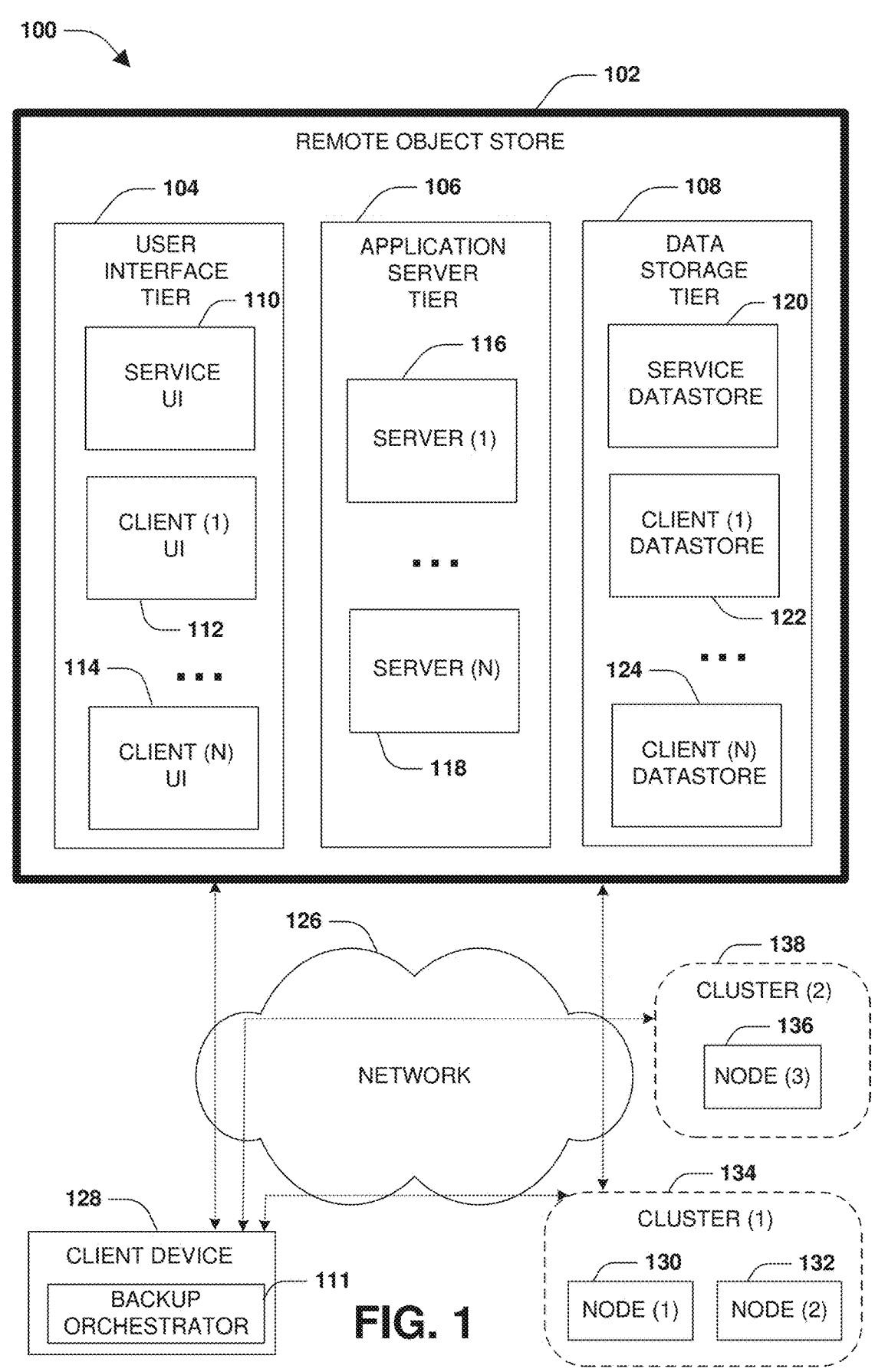
FIG. 1 is a block diagram illustrating an example of a remote object store hosting resources that a backup orchestrator can backup and restore in accordance with an embodiment of the present technology.

The techniques described herein are directed to backing up and restoring a file system, a storage virtual machine, a cluster, or other resources located within a remote object store. Many users are storing their data and hosting applications through remote object stores. In some embodiments, a remote object store may be a third-party cloud hyperscaler that provides cost effective, scalable, long-term storage and compute resources. As such, in accordance with various embodiments, a remote object store is a third party storage service providing infrastructure as a service that allows users to upload any size and type of computer file where the third party service manages the underlying hardware components and can easily scale resources (e.g., storage, compute, memory, etc.) to meet demand. The remote object store may deploy and host a computing environment for a user. The computing environment may include compute resources and storage resources used by nodes of a cluster to provide data storage, application hosting, and services to the users. Such resources may include processor resources, memory resources, a service instance, an application, a pod, a container, a file system, a volume, an aggregate, a storage virtual machine, storage polices, etc. The remote object store may treat these resources as objects that have their own identifiers used by the remote object store to track and reference the resources. For example, the remote object store may assign identifiers to a cluster of nodes, individual volumes, storage virtual machines, export policies, backup policies, network interfaces, an IP space, and/or other resources.

When a user deploys a computing environment with these resources through the remote object store, the user may have an expectation that there will be some level of data protection. Unfortunately, the remote object store may not natively provide the user with a mechanism to create a backup of certain types of resources that may not be natively provided by the remote object store, such as a storage file system that is not native to the remote object store. Backing up these types of resources is difficult because of the dynamic nature of these resources and dependencies amongst the resources. For example, a file system (the storage file system) is very dynamic in nature where there could be any number of vServers, export polices, snapshot policies, network interfaces, properties of whether a network file system (NFS) is enabled or not, properties of whether iSCSI is enabled or not, and/or other resources of the file system that are not static. Thus, there are a lot of dynamic resources that are difficult to interpret and capture through conventional backup mechanisms. Also, a storage file system may be typically hosted by a storage operating system of an on-premise node, and thus storage functionality (e.g., backup and restore functionality) of the on-premise node has control over and the ability to interpret/understand the storage file system. This makes performing backup and restore trivial from the on-premise node. However, when the storage file system is hosted within the remote object store that is controlled by a third party service and not the on-premise node, orchestrating backup and restore for the storage file system is difficult, if not impossible.

Additionally, resources can depend upon one another, and this dependency is difficult to ascertain and track in the backup. For example, a snapshot policy for a volume depends upon the volume, and thus the snapshot policy cannot be restored until the volume has been restored. This dependency is not captured within the backup, and thus the dependency is not preserved when restoring the resources, which can lead to errors and malfunctioning of the resources after being restored. The dynamic nature of resources and dependencies amongst the resources makes backing up and restoring these types of resources in the remote data store difficult. Thus, there is no native way to backup and restore file systems, storage virtual machines, and/or clusters within the object store. If there is a failure associated with hosting a resource, then the user will experience a service disruption and there could be unrecoverable data loss because there is no backup of the resource.

Accordingly, as provided herein, a backup orchestrator is configured for orchestrating the backup and restore of resources, such as a file system, a cluster, a storage virtual machine, or other resources, located within a remote object store such as a third-party cloud hyperscaler. The backup orchestrator is configured with functionality for understanding the dynamic nature of these resources and the dependencies of the resources so that a backup of the resources will capture and track such dynamic properties and dependencies. In particular, the backup orchestrator identifies these dynamic properties by parsing an application programming interface specification to identify endpoints of the resources (e.g., a communication endpoint such as a URL where the resource can be reached through API calls). The backup orchestrator performs GET operations (e.g., an HTTP request to read a representation of a resource, which may be return in an XML, JSON, or other format) targeting the endpoints to retrieve these properties that are then included within the backup. Also, the backup orchestrator identifies the dependencies by parsing a link relationship specification of links (e.g., HAL links embedded within the resources) to identify what other resources a resource depends upon based upon the resource having links to those other resources. In some embodiments, a text parsing process may be executed upon the link relationship specification to identify text strings matching definitions of resources (e.g., text strings starting with "volume," "storage virtual machine," etc., which are followed by text describing the resources and dependencies). These properties (dynamic properties) and dependencies are preserved within the backup so that the backup can be subsequently used to restore the resources back to the remote object store or another destination location (e.g., a different third-party cloud hyperscaler, on-premise, etc.) in a manner that restores and preserves the properties and dependencies.

In some embodiments of backing up resources, a plurality of resources of a computing environment are hosted within a third-party cloud hyperscaler (e.g., a cloud computing environment of a third-party cloud service provider). The resources may include storage resources, compute resources, and/or other types of resources. The resources may include a cluster of nodes, volumes, aggregates, network interfaces, IP spaces, Ethernet ports, export policies, snapshot polices, file systems, storage virtual machines, and/or a variety of other types of resources. The plurality of resource may comprise a primary resource that is to be backed up. The primary resource may be a file system, a storage virtual machine, an entire cluster or portion thereof, or any other type of resource.

The backup orchestrator may receive a backup request to back up the primary resource. For example, a user that has deployed the computing environment to the third-party cloud hyperscaler may submit the backup request to back up the primary resource, such as a storage virtual machine hosted by the third-party cloud hyperscaler. Accordingly, the backup orchestrator obtains a specification (e.g., a yaml file defining a like relationship specification) used by the third-party cloud hyperscaler to describe the computing environment. In an embodiment, the specification may comprise an open application programming interface (API) specification of representational state transfer application (REST) APIs. The specification may describe the resources hosted within the third-party cloud hyperscaler, along with REST API endpoints at which the resources can be accessed within the third-party cloud hyperscaler. In this way, the backup orchestrator parses the specification to identify a set of resources that are associated with (e.g., dependent upon or from) the primary resource. For example, an export policy, a volume, network interfaces, and/or other resources may be associated with the storage virtual machine. Thus, the backup orchestrator identifies these resources through the specification describing resources of the computing environment hosted by the third-party cloud hyperscaler.

The backup orchestrator retrieves an IP address that used to route operations to the third-party cloud hyperscaler for accessing the computing environment and the resources of the computing environment. The backup orchestrator also retrieves credential used to authenticate with the third-party cloud hyperscaler for accessing the computing environment and the resources of the computing environment (e.g., credentials supplied by the user owning the resources).

The backup orchestrator generates GET operations for each of the resources associated with the primary resource to be backed up, such as to retrieve information related to volumes hosted by the storage virtual machine. Because the resources may be associated with (e.g., dependent upon or from) the primary resource, the resources are identified and included within the backup of the primary resource. In this way, each GET operation may target a REST API endpoint of a resource, such as the primary resource or the resources associated with the primary resource. The backup orchestrator transmits the GET operations, utilizing the IP address and credentials, to the third-party cloud hyperscaler. A GET operation targeting a REST API endpoint of a resource is routed to the REST API endpoint and retrieves (gets) the resource and properties (dynamic properties) of the resource from the third-party cloud hyperscaler. In some embodiments of a property of a resource, a volume resource may have a volume size, a volume name, an ownership property, access rights, and/or other properties. In this way, the primary resource such as the storage virtual machine, resources associated with the primary resource such as the volumes, and properties of such resources may be retrieved by the backup orchestrator from the third-party cloud hyperscaler using the GET operations.

The backup orchestrator evaluates links, such as hypertext application language (HAL) links, embedded within the resources retrieved from the third-party cloud hyperscaler in order to determine dependencies amongst resources. The HAL links of a resource may identify and link to another resource upon which the resource depends, such as by specifying a name or UUID of the other resource (e.g., an identifier assigned by the third-party cloud hyperscaler to the resource). In some embodiments, HAL links embedded within a storage virtual machine resource may link to a snapshot policy, an IP space, a security policy, and/or other resources upon which the storage virtual machine resource depends. The identification of dependencies may be a recursive/iterative process because the primary resource may depend upon a resource that depends on yet another resource, and so forth. In this way, the HAL links can be evaluated to identify dependencies between the primary resource being backed up and other resources. In some embodiments, the backup orchestrator generates a dependency graph or other dependency information for the primary resource and other resources based upon the dependencies.

The backup orchestrator generates the backup to include the primary resource, properties of the primary resource, the resources associated with the primary resource, properties of these resources, and the dependency information such as from the dependency graph. The backup orchestrator may store the backup within the third-party cloud hyperscaler or may store the backup in a storage location separate from and remote to the third-party cloud hyperscaler. The backup orchestrator may generate any number of backups as point in time representations of the primary resource (e.g., the storage virtual machine), resources upon which the primary resource depends, and dependencies amongst the resources.

The backup orchestrator may subsequently receive a restore request to restore the primary resource. In some embodiments, the restore request is to restore a current instance of the primary resource within the third-party cloud hyperscaler back to a prior version of the primary resource as captured by the backup. In some embodiments, the restore request is to restore the primary resource to create a clone of the primary resource that is separate from the current instance of the primary resource. In some embodiments, the cloned primary resource and the current instance of the primary resource may be concurrently hosted by the third-party cloud hyperscaler. This may involve modifying IP addresses and/or other identifying information for the cloned primary resource to be different than the current instance in order to avoid network conflicts. In some embodiments, the cloned primary resource may be deployed within the third-party cloud hyperscaler or within a different environment such as through a cloud computing environment of a different cloud storage provider, and there may be no current instance of the primary resource.

In response to receiving the restore request, the backup orchestrator identifies the backup of the primary resource as corresponding to a state of the primary resource to be restored (e.g., the backup may comprise a date or identifier referenced by the restore request). The backup orchestrator evaluates the dependency graph within the backup in order to create a restore order for restoring the primary resource and other resources captured within the backup. In some embodiments, if the dependency graph indicates that the primary resource (e.g., a storage virtual machine) depends upon an IP space, a snapshot policy, a security policy, and/or other resources, then those resources will be restored before the primary resource. If the dependency graph indicates that the IP space depends upon another resource, then that resource will be restored before the IP space and the primary resource. In some embodiments, an IP space for the storage virtual machine, a snapshot policy for the storage virtual machine, and a security policy for the storage virtual machine are restored before the storage virtual machine is restored due to the dependencies amongst such resources. In this way, the restore order specifies an order such that a resource will not be restored until all resources upon which the resource depends are first restored.

The backup orchestrator generates REST operations that will be used to restore each resource and properties of the resources to a restore destination such as the third-party cloud hyperscaler. If the restore destination is the third-party cloud hyperscaler, then the REST operations may comprise the IP address and credentials previously used to generate the backup. A REST operation for a resource may comprise a POST operation if the backup indicates that the resource supports the POST operation. If the backup indicates that the resource does not support the POST operation, then a PATCH operation may be performed as the REST operation. If a resource does not support POST or PATCH operations, then the resource may be skipped during the restore. The backup orchestrator may transmit the REST operations to the third-party cloud hyperscaler according to the restore order so that the resources are restored/created according to the restore order in order to preserve the dependencies amongst the resources. These operations comprise parameters such as configuration parameters and values of the parameters that are used to reconstruct the resources. In this way, the REST operations restore the resources from the backup and properties of the resources to create a restored primary resource.

Various embodiments of the present technology provide for a wide range of technical effects, advantages, and/or improvements to computing systems and components. For example, various embodiments may include one or more of the following technical effects, advantages, and/or improvements: 1) the ability to orchestrate the creation of backups for resources (e.g., a file system, a storage virtual machine, or an entire cluster) hosted within a remote object store such as a third-party cloud hyperscaler; 2) the ability to orchestrate the creation of backups for resources that are dynamic and not static, such a file system that can have any number of vServers, volumes, aggregates, backup polices, network interfaces, and/or other dynamic properties that can change over time; 3) the ability to orchestrate the creation of backups that preserve the dependencies amongst objects so that a subsequent restore of the resources will preserve the dependences amongst the resources for proper operation after being restored; 4) the ability to identify HAL links for identifying the dependencies; 5) the ability to parse a specification in order to identify resources associated with (e.g., depending upon or from) a primary resource within the remote object store to back up; 6) the ability to restore resources from a backup according to a restore order that preserves the dependences amongst the resources and dynamic properties of the resources for proper operation after being restored; 7) the ability to restore a primary resource back to the remote object store or other restore destination; 8) the ability to restore the primary resource as a cloned primary resource that may be concurrently hosted along with a current/existing instance of the primary resource; and/or 9) the ability to restore the current/existing instance of the primary resource back to a state captured by the backup.

FIG. 1 is a block diagram illustrating an example of a remote object store in accordance with an embodiment of the present technology. In one example, the techniques described herein, such as a backup orchestrator 111, may be implemented within a client device 128, such as a computer, a server, a container of a container orchestration platform (e.g., Kubernetes), a serverless thread, a data processing system, etc. In some embodiments, a backup orchestrator 111 may be implemented by the client device 128, and may be configured to perform backup and restore operations for storage virtual machines, file systems, clusters, and/or other resources hosted within a remote object store 102. In another example, the techniques described herein may be implemented within one or more nodes, such as a first node 130 and/or a second node 132 within a first cluster 134, a third node 136 within a second cluster 138, etc., which may be part of a on-premise, cloud-based, or hybrid storage solution. In some embodiments, instances of the backup orchestrator 111 may be hosted by the first node 130, the second node 132, and/or the third node 138. In some embodiments, the backup orchestrator 111 may be implemented by a data processing system of the client device 128, the first node 130, the second node 132, and/or the third node 138.

A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a remote object store 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes 130, 132, and/or 136, and/or the remote object store 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage.

The first node 130 may store data associated with the operations within volumes or other data objects/structures hosted within locally attached storage, remote storage hosted by other computing devices accessible over the network 126, storage provided by the remote object store 102, etc. The first node 130 may replicate the data and/or the operations to other computing devices, such as to the second node 132, the third node 136, a storage virtual machine executing within the remote object store 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the backup orchestrator 111 may be implemented by a storage operating system or may be implemented by a separate module that interacts with the storage operating system. The storage operating system may be hosted by the client device, 128, a node, the remote object store 102, or across a combination thereof. In some embodiments, the storage operating system may execute within a storage virtual machine, a hyperscaler, or other computing environment. The storage operating system may implement a storage file system to logically organize data within storage devices as one or more storage objects and provide a logical/virtual representation of how the storage objects are organized on the storage devices.

A storage object may comprise any logically definable storage element stored by the storage operating system (e.g., a volume stored by the first node 130, a cloud object stored by the remote object store 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In some embodiments, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

In an embodiment, various types of synchronization may be implemented by a synchronization module associated with the storage operating system. In an embodiment, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138 and/or between a node of a cluster and an instance of a node or virtual machine in the remote object store 102.

As an example, during synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the remote object store 102. In an embodiment, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the remote object store 102 by transmitting the data within objects to the remote object store 102. In one example, the first node 130 may locally store frequently accessed data within locally attached storage. Less frequently accessed data may be transmitted to the remote object store 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the remote object store 102. In yet another example, the client device 128 transmits and stores the data directly to the remote object store 102 without the use of the first node 130.

In some embodiments, the remote object store 102 may store and manage resources such as storage virtual machines, files systems, clusters of nodes, etc. The backup orchestrator 111 may orchestrate the backup and restore of such resources within the remote object store 102.

The management of storage and access to data can be performed by one or more storage virtual machines (SVMs) or other storage applications that provide software as a service (SaaS) such as storage software services. In one example, an SVM may be hosted within the client device 128, within the first node 130, or within the remote object store 102 such as by the application server tier 106. In another example, one or more SVMs may be hosted across one or more of the client device 128, the first node 130, and the remote object store 102. The one or more SVMs may host instances of the storage operating system.

In an embodiment, the storage operating system may be implemented for the remote object store 102. The storage operating system may allow client devices to access data stored within the remote object store 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the remote object store 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the remote object store 102 may provide the client device 128 and/or the first node 130 with access to user interfaces associated with the storage and access of data and/or other services provided by the remote object store 102. In an embodiment, a service user interface 110 may be accessible from the remote object store 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the remote object store 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the remote object store 102.

As shown, a variety of clients, such as the client device 128 and the first node 130, incorporating and/or incorporated into a variety of computing devices may communicate with the remote object store 102 through one or more networks, such as the network 126. For example, a client may incorporate and/or be incorporated into a client application (e.g., software) implemented at least in part by one or more of the computing devices.

The remote object store 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the remote object store 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the present technology, the remote object store 102 may be a multi-tenant and service platform operated by an entity in order to provide multiple tenants with a set of business-related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
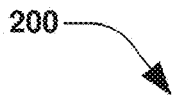
FIG. 2 is a block diagram illustrating an example of nodes accessing a remote object store in accordance with an embodiment of the present technology.

FIG. 2 is a block diagram illustrating an example of nodes accessing a remote object store in accordance with an embodiment of the present technology. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, nodes 206(1)-206(n), for example), although any number of other elements or components can also be included in the clustered network environment 200 in other examples. This technology provides a number of advantages including methods, non-transitory computer readable media, and computing devices that implement the techniques described herein.

In some embodiments, the nodes 206(1)-206($n$) may host a backup orchestrator 211 configured to facilitate the backup and restore of storage virtual machines, files systems, clusters of nodes/resources, and/or other resources stored within a remote object store 236.

In this example, nodes 206(1)-206($n$) can be primary or local storage controllers or secondary or remote storage controllers that provide client devices 208(1)-208($n$) with access to data stored within data storage devices 210(1)-210($n$) and a remote object store 236 (also referred to as cloud storage node(s)). The nodes 206(1)-206($n$) may be implemented as hardware, software (e.g., a storage virtual machine), or combination thereof.

The data storage apparatuses 202(1)-202($n$) and/or nodes 206(1)-206($n$) of the examples described and illustrated herein are not limited to any particular geographic areas and can be clustered locally and/or remotely via a cloud network, or not clustered in other examples. Thus, in one example the data storage apparatuses 202(1)-202($n$) and/or node 206(1)-206($n$) can be distributed over a plurality of storage systems located in a plurality of geographic locations (e.g., located on-premise, located within a cloud computing environment, etc.); while in another example a clustered network can include data storage apparatuses 202(1)-202($n$) and/or node 206(1)-206($n$) residing in a same geographic location (e.g., in a single on-site rack).

In the illustrated example, one or more of the client devices 208(1)-208($n$), which may be, for example, personal computers (PCs), computing devices used for storage (e.g., storage servers), or other computers or peripheral devices, are coupled to the respective data storage apparatuses 202 (1)-202($n$) by network connections 212(1)-212($n$). Network connections 212(1)-212($n$) may include a local area network (LAN) or wide area network (WAN) (i.e., a cloud network), for example, that utilize TCP/IP and/or one or more Network Attached Storage (NAS) protocols, such as a Common Internet File system (CIFS) protocol or a Network File system (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208($n$) may be general-purpose computers running applications and may interact with the data storage apparatuses 202(1)-202($n$) using a client/server model for exchange of information. That is, the client devices 208(1)-208($n$) may request data from the data storage apparatuses 202(1)-202($n$) (e.g., data on one of the data storage devices 210(1)-210($n$) managed by a network storage controller configured to process I/O commands issued by the client devices 208(1)-208($n$)), and the data storage apparatuses 202(1)-202($n$) may return results of the request to the client devices 208(1)-208($n$) via the network connections 212(1)-212($n$).

The nodes 206(1)-206($n$) of the data storage apparatuses 202(1)-202($n$) can include network or host nodes that are interconnected as a cluster to provide data storage and management services, such as to an enterprise having remote locations, cloud storage (e.g., a storage endpoint may be stored within the remote object store 236), etc., for example. The remote object store 236 may store resources for which the backup orchestrator 211 is configured to perform backup and restore functionality. Such nodes 206(1)-206($n$) can be attached to the cluster fabric 204 at a connection point, redistribution point, or communication endpoint, for example. One or more of the nodes 206(1)-206($n$) may be capable of sending, receiving, and/or forwarding information over a network communications channel, and could comprise any type of device that meets any or all of these criteria.

In an embodiment, the nodes 206(1) and 206($n$) may be configured according to a disaster recovery configuration whereby a surviving node provides switchover access to the data storage devices 210(1)-210($n$) in the event a disaster occurs at a disaster storage site (e.g., the node 206(1) provides client device 212($n$) with switchover data access to data storage devices 210($n$) in the event a disaster occurs at the second storage site). In other examples, the node 206($n$) can be configured according to an archival configuration and/or the nodes 206(1)-206($n$) can be configured based on another type of replication arrangement (e.g., to facilitate load sharing). Additionally, while two nodes are illustrated in FIG. 2, any number of nodes or data storage apparatuses can be included in other examples in other types of configurations or arrangements.

As illustrated in the clustered network environment 200, nodes 206(1)-206($n$) can include various functional components that coordinate to provide a distributed storage architecture. For example, the nodes 206(1)-206($n$) can include network modules 214(1)-214($n$) and disk modules 216(1)-216($n$). Network modules 214(1)-214($n$) can be configured to allow the nodes 206(1)-206($n$) (e.g., network storage controllers) to connect with client devices 208(1)-208($n$) over the storage network connections 212(1)-212($n$), for example, allowing the client devices 208(1)-208($n$) to access data stored in the clustered network environment 200.

Further, the network modules 214(1)-214($n$) can provide connections with one or more other components through the cluster fabric 204. For example, the network module 214(1) of node 206(1) can access the data storage device 210($n$) by sending a request via the cluster fabric 204 through the disk module 216($n$) of node 206($n$) when the node 206($n$) is available. Alternatively, when the node 206($n$) fails, the network module 214(1) of node 206(1) can access the data storage device 210($n$) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216($n$) can be configured to connect data storage devices 210(1)-210($n$), such as disks or arrays of disks, SSDs, flash memory, or some other form of data storage, to the nodes 206(1)-206($n$). Often, disk modules 216(1)-216($n$) communicate with the data storage devices 210(1)-210($n$) according to the SAN protocol, such as SCSI or FCP, for example, although other protocols can also be used. Thus, as seen from an operating system on nodes 206(1)-206($n$), the data storage devices 210(1)-210($n$) can appear as locally attached. In this manner, different nodes 206(1)-206($n$), etc. may access data blocks, files, or objects through the operating system, rather than expressly requesting abstract files.

While the clustered network environment 200 illustrates an equal number of network modules 214(1)-214($n$) and disk modules 216(1)-216($n$), other examples may include a differing number of these modules. For example, there may be a plurality of network and disk modules interconnected in a cluster that do not have a one-to-one correspondence between the network and disk modules. That is, different nodes can have a different number of network and disk modules, and the same node can have a different number of network modules than disk modules.

Further, one or more of the client devices 208(1)-208(n) can be networked with the nodes 206(1)-206(n) in the cluster, over the storage connections 212(1)-212(n). As an example, respective client devices 208(1)-208(n) that are networked to a cluster may request services (e.g., exchanging of information in the form of data packets) of nodes 206(1)-206(n) in the cluster, and the nodes 206(1)-206(n) can return results of the requested services to the client devices 208(1)-208(n). In one example, the client devices 208(1)-208(n) can exchange information with the network modules 214(1)-214(n) residing in the nodes 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more file systems within the clustered network environment 200. Volumes 218(1)-218(n) can span a portion of a disk or other storage device, a collection of disks, or portions of disks, for example, and typically define an overall logical arrangement of data storage. In one example, volumes 218(1)-218(n) can include stored user data as one or more files, blocks, or objects that may reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the remote object store 236 to provide tiered storage, for example, and other arrangements can also be used in other examples.

In one example, to facilitate access to data stored on the disks or other structures of the data storage devices 210(1)-210(n), a file system may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically, the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., SCSI target address). To represent respective volumes, a target address on the data storage devices 210(1)-210(n) can be used to identify one or more of the LUNs. Thus, for example, when one of the nodes 206(1)-206(n) connects to a volume, a connection between the one of the nodes 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
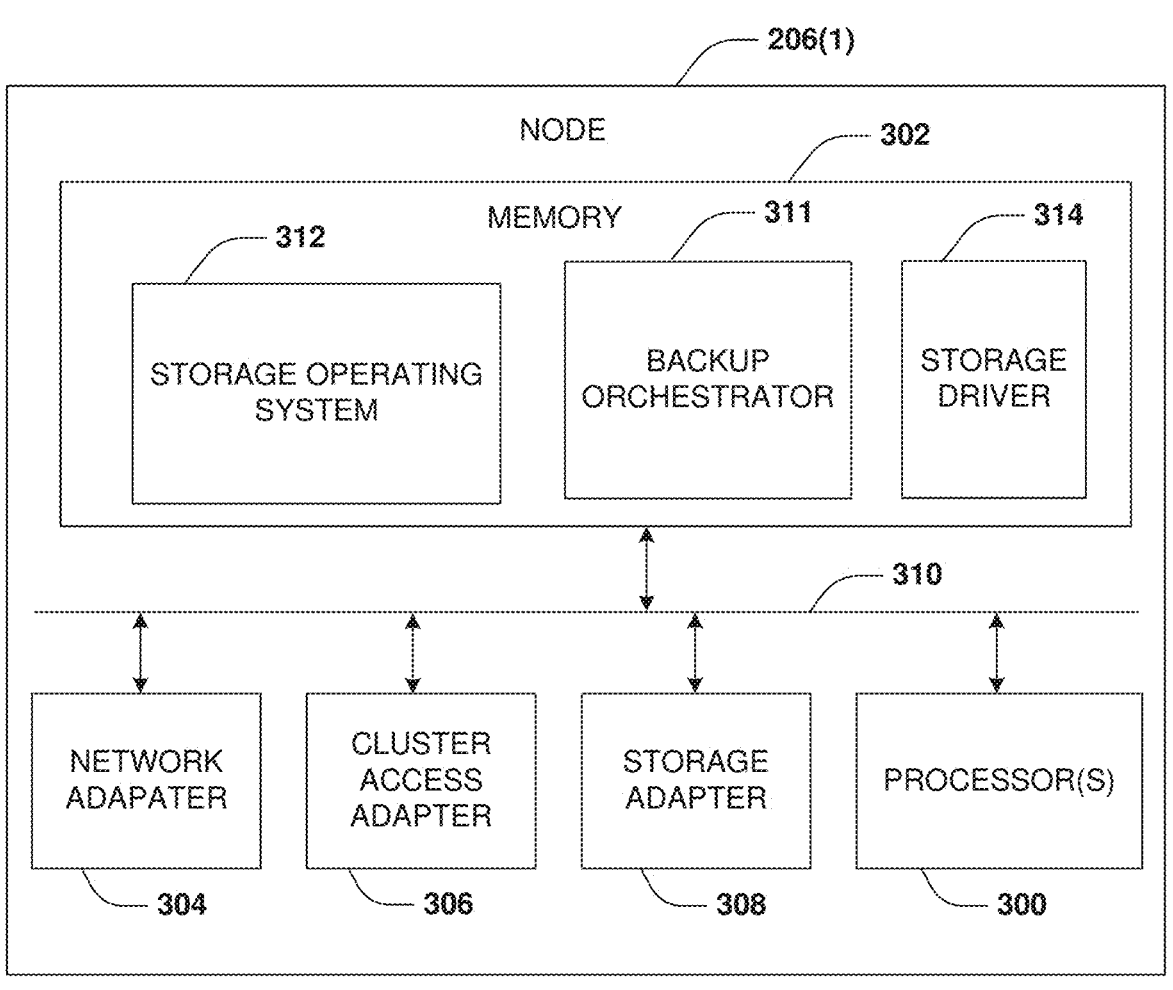
FIG. 3 is a block diagram illustrating an example of a node in accordance with an embodiment of the present technology.

FIG. 3 is a block diagram illustrating an example of a node in accordance with an embodiment of the present technology. Node 206(1) in this particular example includes processor(s) 300, a memory 302, a network adapter 304, a cluster access adapter 306, and a storage adapter 308 interconnected by a system bus 310. In other examples, the node 206(1) comprises a virtual machine, such as a virtual storage machine. The node 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node 206(n) is substantially the same in structure and/or operation as node 206(1), although the node 206(n) can also include a different structure and/or operation in one or more aspects than the node 206(1). In some embodiments, the node 206(1) may host a backup orchestrator 211 within memory 302. The backup orchestrator 211 may be configured to facilitate the backup and restore of storage virtual machines, files systems, clusters of nodes/resources, and/or other resources stored within a remote object store 236.

The network adapter 304 in this example includes the mechanical, electrical and signaling circuitry needed to connect the node 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g., a WAN) (not shown) with remote object store 236 to process storage operations associated with data stored thereon.

The storage adapter 308 cooperates with the storage operating system 312 executing on the node 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (ISCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node in the cluster) where the information is formatted into a data packet and returned to a requesting one of the client devices 208(1)-208(2) and/or sent to another node attached via the cluster fabric 204. In some examples, a storage driver 314 in the memory 302 interfaces with the storage adapter to facilitate interactions with the data storage devices 210(1)-210(n).

The storage operating system 312 can also manage communications for the node 206(1) among other devices that may be in a clustered network, such as attached to a cluster fabric 204. Thus, the node 206(1) can respond to client device requests to manage data on one of the data storage devices 210(1)-210(n) or cloud storage device(s) 236 (e.g., or additional clustered devices) in accordance with the client device requests.

The file system module 318 of the storage operating system 312 can establish and manage one or more file systems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a file system.

In the example node 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

The storage operating system 312, portions of which are typically resident in the memory 302 and executed by the processor(s) 300, invokes storage operations in support of a file service implemented by the node 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein, as discussed above and further below.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Figure 5:
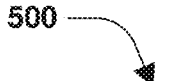
FIG. 5 is a block diagram illustrating an example of backing up a resource located within a remote object store in accordance with an embodiment of the present technology.

FIG. 4 is a flow chart illustrating an example of backing up a resource located within a remote object store in accordance with an embodiment of the present technology, which is further described in conjunction with FIG. 5 illustrating an example of backing up a resource located within a remote object store in accordance with an embodiment of the present technology. A remote object store 502 (e.g., a cloud storage provider, an off-prem computing environment, a third-party cloud hyperscaler, a container-ized environment such as Kubernetes, etc.) may be configured to host computing environments for users. In some embodiments, a remote object store and a third-party cloud hyperscaler may be used interchangeably to refer to a computing environment used to host resources. A computing environment deployed in the remote object store 502 for a user may comprise resources, such as compute resources and storage resources. For example, the computing environment may comprise a cluster resource 504 of nodes, a storage virtual machine resource 506, a network interface resource 508, a file system resource 510, a volume resource 512, an aggregate resource 514, and/or a variety of other types of resources or combinations thereof.

A backup orchestrator 516 may be configured to orchestrate the back up of one or more of the resources hosted by the remote object store 502. Even though the backup orchestrator 516 is illustrated as being remote to the remote object store 502, the backup orchestrator 516 may be hosted within the remote object store 502 or hosted outside the remote object store 502 such as within a container of a container orchestration platform (e.g., a kubernetes cluster), an on-premis device, a virtual machine, etc. For example, the backup orchestrator may be hosted through a node, a virtual machine, a container (e.g., a container within a kubernetes cluster), hardware, software, or combination thereof.

The backup orchestrator 516 may receive an indication that a primary resource within the remote object store 502, such as the file system resource 510, is to be backed up. Accordingly, during operation 402 of method 400, the backup orchestrator 516 may parse an API specification 518 of REST APIs associated with the computing environment hosted by the remote object store 502 in order to identify information used to perform the backup of the primary resource. In particular, the backup orchestrator 516 parses the API specification to identify REST API endpoints of resources of the computing environment within the remote object store 502. In some embodiments, a REST API endpoint corresponds to an end of a communication channel. The REST API endpoint specifies where a resource can be accessed by an API, such as a URL or URI of the resource.

In this way, the REST API endpoint, such as the URL or URI, of the resource can be targeted by a REST operation for accessing the resource The API specification may map the REST API endpoints to the resources located at each REST API endpoint. A REST API endpoint of a resource may correspond to an endpoint at which the resource within the remote object store 502 may be accessed using REST operations. Each resource may be assigned an identifier by the remote object store 502, and thus the API specification 518 may map identifiers of resources to REST API endpoints of the resources. The backup orchestrator 516 may utilize an identifier of the primary resource to locate a mapping within the API specification 518 between the identifier of the primary resource and a REST API endpoint of the primary resource. Additionally, the backup orchestrator 516 may evaluate the API specification 518 to identify resources associated with the primary resource (e.g., the file system resource 510 may be associated with such as dependent upon or from the volume resource 512, the aggregate resource 514, a backup policy resource, an export policy resource, etc.) and REST API endpoints of the resources.

During operation 404 of method 400, the backup orchestrator 516 may retrieve an IP address that can be used to transmit REST operations to the remote object store 502. The backup orchestrator 516 may also retrieve credentials that the backup orchestrator 516 can use to authenticate with the remote object store 502 in order to access the resources of the computing environment hosted within the remote object store 502.

During operation 406 of method 400, the backup orchestrator 516 transmits GET operations 524, targeting the REST API endpoints of the resources, to the remote object store 502. The GET operations 524 may utilize the IP address of the remote object store 502 and/or the credentials in order to obtain access to the REST API endpoints as targets of the GET operations 524. The GET operations 524 are performed in order to retrieve the resources (e.g., the primary resource and resources upon which the primary resource depends or is associated) and properties of the resources (e.g., a volume name, a volume size, volume ownership, volume access rights, and/or other dynamic properties). During operation 408 of method 400, the backup orchestrator 516 determine whether all resources and properties have been successfully retrieved from the remote object store 502 using the GET operations 524. If there are still more resources or properties to obtain, then the backup orchestrator 516 performs operation 406 for any remaining resources and/or properties of the resources. If any GET operations failed, then the GET operations 524 may be retried or an error may be returned for the backup request.

Once the resources and properties of the resources have been retrieved, the backup orchestrator 516 may parse link relationship specifications 522 of the resources to identify links between the resources. In some embodiments, a link relationship specification for a resource may be a HAL specification with HAL links to resources upon which the resource depends. The HAL specification for a resource may be embedded into the resource. A link from the resource to another resource may indicate that the resource depends upon the other resource. The other resource may be identified by an identifier assigned to the other resource (a UUID) or by a name of the other resource, for example. The links may be used to generate dependency information, such as a dependency graph representing dependencies between the resources. The dependency information may be included within a backup 526 that will be created for the primary resource. In some embodiments, the dependency graph may comprise a directed graph. The directed graph may comprise nodes that represent resources. Links within the directed graph indicate relationships between resources. For example, a first node represents a first resource, and a second node represents a second resource. A link from the first node to the second node represents a relationship where the first resource depends upon the second resource.

In an embodiment of determining dependent information for a resource such as an export policy, a GET operation to an endpoint of the export policy may return an identifier of the export policy, a name of the export policy, a reference to the export policy, and a record for a storage virtual machine linked to by the export policy. The record may comprise a UUID assigned by the remote object store 502 to the storage virtual machine (e.g., ab2d45566-783234-dsd12), a name of the storage virtual machine (e.g., vs1), and a link to the storage virtual machine (e.g.,/api/svm/svms/ab2d45566-783234-dsd12) derived from a path to the storage virtual machine and the UUID. A GET operation to an endpoint of the storage virtual machine may return the UUID of the storage virtual machine, the name of the storage virtual machine, properties of the storage virtual machine (e.g., whether the storage virtual machine is running, whether NFS is enabled or not, whether CIFS is enabled or not, whether NVME is enabled or not, whether iSCSI is enabled or not, a retention time period, whether aggregates have been delegated to the storage virtual machine, a maximum number of volumes, etc.), a record for an IP space linked to by the storage virtual machine, and a record for a snapshot policy linked to by the storage virtual machine. The record for the IP space may comprise a UUID assigned by the remote object store 502 to the IP space (e.g., faeb879-2323-dsf3) and a link to the IP space (e.g., /api/network/ipspaces/faeb879-2323-dsf3) derived from a path to the IP space and the UUID. The record for the snapshot policy may comprise a UUID assigned by the remote object store 502 to the snapshot policy (e.g., 4345dwsf-87dfd-9ds3) and a link to the snapshot policy (e.g.,/api/storage/snapshot-policies/4345dwsf-87dfd-9ds3) derived from a path to the snapshot policy and the UUID.

During operation 410 of method 400, the backup orchestrator 516 creates the backup 526 of the primary resource. The backup 526 may comprise the primary resource, the resources associated with the primary resource (e.g., resources upon which the primary resource depends) and the properties of the resources and the primary resource, which may be structured within the backup 526 according to the dependencies amongst the resources. In some embodiments, the backup 526 may comprise a backup file populated with the properties and/or other metadata describing the resources and primary resource, along with the dependency information such as the dependency graph. In some embodiments, the backup 526 may be populated with information relating to what REST operations are supported by each resource, which may be identified from the API specification 518. For example, an indication may be included within the backup 526 as to what REST operations are supported, such as whether a resource supports POST operations and/or PATCH operations. If a resource does not support POST operations or PATCH operations, then the resource may be excluded from being included within the backup 526 because the resource cannot be restored without performing such operations. The backup orchestrator 516 may store the backup 526 within the remote object store 502 or in separate storage external to the remote object store 502.

FIG. 6 is a block diagram illustrating an example of restoring a resource located within a remote object store in accordance with an embodiment of the present technology, which is further described in conjunction with FIG. 7 illustrating an example of restoring a resource located within a remote object store in accordance with an embodiment of the present technology. A remote object store 702 may be configured to host computing environments for users. A computing environment deployed in the remote object store 702 for a user may comprise resources, such as compute resources and storage resources. For example, the computing environment may comprise a cluster resource 704 of nodes, a storage virtual machine resource 706, a network interface resource 708, a file system resource 710, a volume resource 712, an aggregate resource 714, and/or a variety of other types of resources or combinations thereof.

A backup orchestrator 716 may be configured to orchestrate a restore operation of a primary resource and/or resources upon which the primary resource depends to the remote object store 702 using a backup 718 of the primary resource. Even though the backup orchestrator 716 is illustrated as being remote to the remote object store 702, the backup orchestrator 716 may be hosted within the remote object store 702 or hosted outside (remote to) the remote object store 702. For example, the backup orchestrator 716 may be hosted through a node, a virtual machine, a container (e.g., a container within a kubernetes cluster), hardware, software, or combination thereof.

In response to receiving a restore request to restore the primary resource, the backup orchestrator 716 may parse the backup 718 to identify properties of a set of resources that include the primary resource and resources the reference/depend or reclusively depend from the primary resource, during operation 602 of method 600. In some embodiments, the backup 718 may comprise the set of resources, the properties of the set of resources, and/or dependency information (e.g., a dependency graph, link relationship specifications such as a HAL specification, links such as HAL links, etc.) indicating which resources depend upon other resources. Accordingly, during operation 604 of method 600, the backup orchestrator 716 may identify the dependencies amongst the set of resources based upon the dependency information. For example, the dependencies may be identified based upon the dependency graph. In another example, the links, within the link relationship specifications embedded with the resources, may be used to identify the dependencies (e.g., a link from a first resource to a second resource indicates that the first resource depends upon the second resource). In another example, resources that reference/depend or recursively depend upon the primary resource may be identified based upon such resources corresponding to REST API endpoints that are under (nested under) the primary resource in a uniform resource identifier (URI). The set of resources may comprise resources that are directly depended from (linked from) the primary resource, resources that are depended from a dependent resource that is directly depended from (linked from) the primary resource, and/or resources that are recursively depended from the primary resource through other dependent resources.

During operation 606 of method 600, a restore order 720 is determined by the backup orchestrator 716 based upon the dependencies (e.g., links) amongst the resources. The restore order 720 may specify an order with which each resource is to be restored such that a resource is not restored until all resources upon which the resource depends are restored. This helps ensure proper operation of the primary resource after restoration, and reduces the chance that errors and inconsistencies not created during the restore operation.

During operation 608 of method 600, the backup orchestrator 716 transmits REST operations 722 for the resources to the remote object store 702 to restore the resources at REST API endpoints within the remote object store 702. The REST operations are transmitted according to the restore order 720. For example, a REST operation to restore a resource may not be transmitted until acknowledgements of successful completion of REST operations for resources depended upon by the resource are received by the backup orchestrator 716. If the backup 718 indicates that a resource supports a POST operation, then the REST operation to restore the resource is implemented as the POST operation. If the backup 718 indicates that a resource does not support a POST operation, then the REST operation to restore the resource is implemented as the PATCH operation. If the resource is defined within an API specification as not being read only, then the resource will be restored. However, if the resource is defined within the API specification as being read only or does not support POST or PATCH operations, then the resource is skipped and is not restored.

If the backup orchestrator 716 determines that a resource is not to be restored and a local resource is to be used in place of restoring the resource, then the local resource already located at the remote object store is substituted for the resource. In some embodiments, if the primary resource being restored is a storage virtual machine, then the backup orchestrator 716 may determine that an aggregate within the backup 718 is not to be restored and an existing local aggregate within the remote object store 702 is to be used instead (e.g., the existing local aggregate may comprise up-to-date data that the storage virtual machine will use after being restored). An identifier of the local resource may be identified by performing a GET operation on a REST API endpoint for the local resource. In this way, a POST operation may be performed for the primary resource to reference the local resource using the identifier. Thus, the restored storage virtual machine will reference the existing local aggregate using the identifier provided through the POST operation.

During operation 610 of method 600, the backup orchestrator 716 may determine whether all resources to be restored have been restored. If there are still resource to restore, then the backup orchestrator 716 may perform operation 608 for those resources. If any REST operations fail to POST or PATCH a resource, then those REST operations may be retried, or an error may be returned.

If all resources have been restored, then the backup orchestrator 716 may complete the restore operation 612, during operation 612 of method 600. In some embodiments, the primary resource may be restored to an existing instance of the primary resource in order to restore the existing instance back to a prior state of the primary resource as captured by the backup 718. In another example, the primary resource may be restored as a clone of the existing instance of the primary instance so that the cloned primary resource and the existing instance may be concurrently hosted in an operational state through the remote object store 702. IP addresses and/or other information for the restored primary resource and/or restored resources upon which the primary resource depends may be modified to be different than IP addresses and/or other information used by the existing instance to ensure there are no conflicts. In another example, the primary resource may be restored to a separate computing environment than where a prior instance of the primary resource was located when the backup was created.

Figure 8:
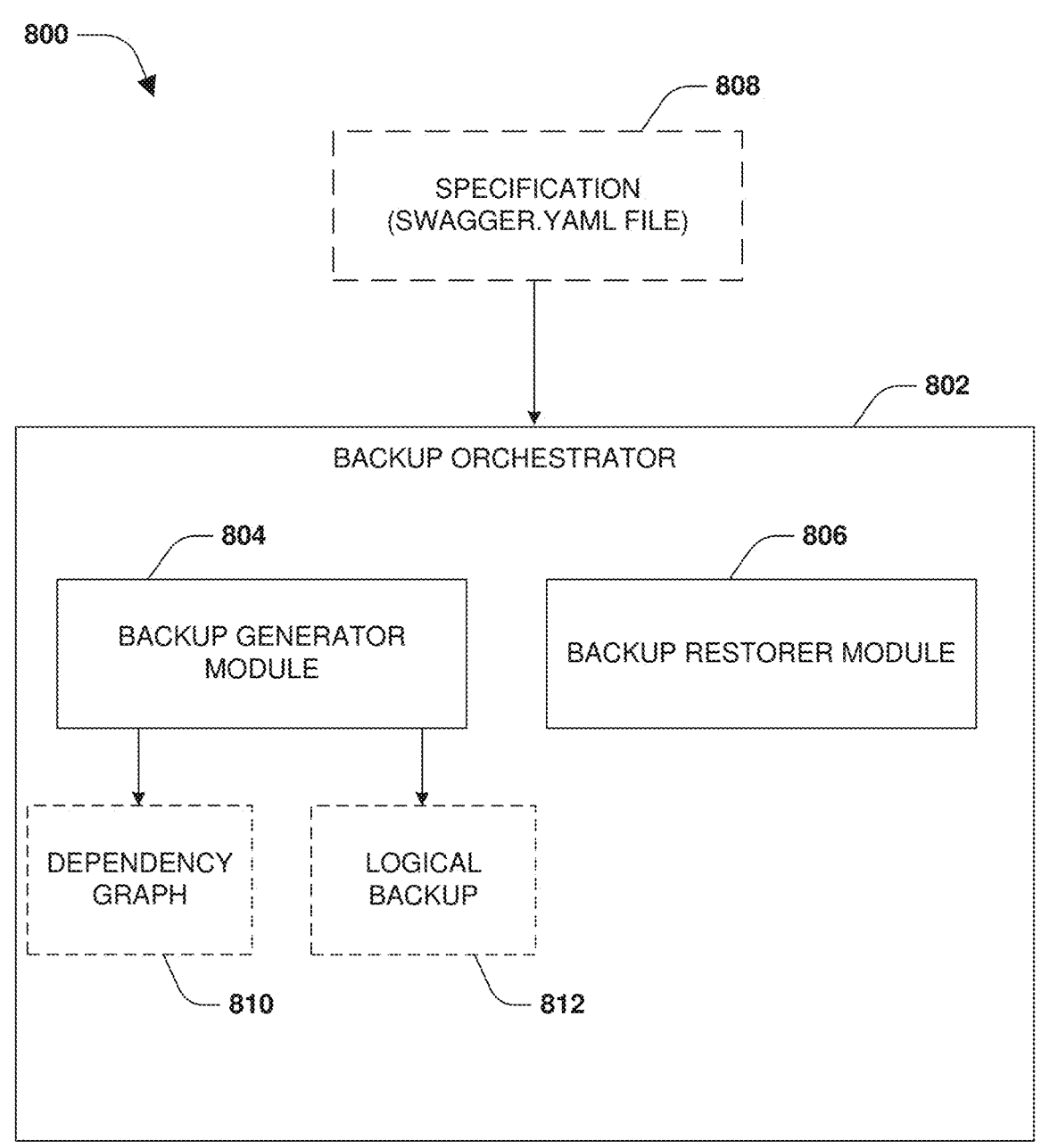
FIG. 8 is a block diagram illustrating an example of a backup orchestrator in accordance with an embodiment of the present technology.

FIG. 8 is a block diagram illustrating an example of a backup orchestrator 802 in accordance with an embodiment of the present technology. In some embodiments, the backup orchestrator 802 implements a backup generator module 804 and a backup restorer module 806, which can operate independent of one another. The backup generator module 804 implements logic that is configured to gather logical data or metadata for a given resource (component) such as a storage virtual machine hosted within a remote object store. For a given resource such as the storage virtual machine, a specification 808 (e.g., a swagger.yaml file used as a link relationship specification, which may be generated by a swagger open-source tool used to design, build, document, and consume REST APIs) is parsed to identify other resources upon which the resource depends. Proper operation of the resource relies on the existence of these other resources, such as where the storage virtual machine would be unable to communicate over a network without the existence of an IP space resource and the storage virtual machine would be unable to operate securely without the existence of a security policy. In general, if resource A relies on resource B, which further relies on resource C, then running a backup script for resource B will include locating resources which rely on resource A (e.g., traversing up a hierarchical structure of resource dependencies) and resources that resource C replies on (e.g., traversing down the hierarchical structure of resource dependencies).

In some embodiments, these dependencies may be mutually exclusive. Accordingly, a dependency graph 810 can be generated by parsing the specification 808 (e.g., the link relationship specification) for any resources where each resource (component) serves as a node and has all the resources that the resource (component) depends upon as neighbors. Upstream neighbors represents resources which rely on the resource (component), and the resource (component) itself relies on all downstream neighbors. In some embodiments, some resources in the dependency graph 810 may be critical for the existence of the resources' neighbors (e.g., resources represented by the neighbors will not operate correctly without these critical resources), while other components may not be critical for the existence of these resources' neighbors. The specification 808 is parsed to identify API endpoints of the resources indicated in the dependency graph 810. Following a top-down approach, an API in the remote object store is repeatedly called through the identified API endpoints for each dependency of a given resource. This results in a series of GET operations to each resource in the dependency graph 810, which is saved as a logical backup 812 such as a JSON file. The logical backup 812 can be saved to a specified path or kept in memory to be consumed by the backup restorer module 806.

The backup restorer module 806 takes the logical backup 812 generated by the backup generator module 804 and the specification 808 as input. The backup restorer module 806 executes a script to restore/create a specified resource in the logical backup 812 at a restore target. In particular, the backup restorer module 806 parses the logical backup 812 to identify a parent resource and dependencies. The specification 808 may be parsed to extract API endpoints and required/optional parameters for issuing POST operations (create requests) for the dependencies and the parent component. The logical backup 812 is parsed to extract the desired values for the parameters in the POST operations. The POST operations are issued from a bottom-up approach where the most essential components and dependencies are created first. The values for the parameters in the POST operations may relate to configuration parameters used to create/restore resources (e.g., a name of a volume, a size of the volume, a path of a volume, etc.). Once the POST operations are complete, then the restore operation is completed.

In some embodiments where a resource is a storage virtual machine, the the dependency graph 810 may indicate that the storage virtual machine depends upon the following resources: 'aggregate' (an aggregate of storage used by the storage virtual machine), 'dns' (a domain name service), 'fc_interface' (a fiberchannel interface), 'ip_interface' (an IP interface), 'ipspace' (an IP space of IP addresses), 'nis' (a network information service), 'qos_policy' (a quality of service policy), and 'snapshot_policy'. These are downstream neighbors in the dependent graph 810. Similarly, the storage virtual machine may have component such as volumes for which the storage virtual machine is relied upon (e.g., the volumes are dependent upon the storage virtual machine), and thus these components are upstream with respect to the storage virtual machine.

In some embodiments, a single GET operation for the virtual machine within the logical backup 812 may return the following:

```
curl -k -X GET https://172.30.0.46/api/svm/svms/
96015513-9880-11ec-aa60-
f39a9c7d278f -H "accept: application/json"
```

```
{
    "uuid": "96015513-9880-11ec-aa60-f39a9c7d278f",
    "name": "svm1",
    "subtype": "default",
    "language": "c.utf_8",
    "aggregates": [
        {
            "name": "aggr2",
            "uuid": "609c3f61-9167-4a49-8ae6-da2a7e034866"
        },
        {
            "name": "aggr1",
            "uuid": "ffa34488-1c69-412b-acdb-816880e0fec1"
        }
    ],
    "state": "running",
    "comment": "",
    "ipspace": {
        "name": "Default",
        "uuid": "965375c4-982b-11ec-aa60-f39a9c7d278f"
    },
    "snapshot_policy": {
        "uuid": "76d8cadd-9880-11ec-aa60-f39a9c7d278f",
        "name": "snap_policy1"
    },
    "nsswitch": {
        "hosts": [ "files", "dns" ],
        "group": ["files"],
        "passwd": ["files"],
        "netgroup": ["files"],
        "namemap": ["files"]
    },
    "nis": {
        "enabled": false
    },
    "ldap": {
        "enabled": false
    },
    "nfs": {
        "allowed": true,
        "enabled": false
    },
    "cifs": {
        "allowed": true,
        "enabled": false
    },
    "iscsi": {
        "allowed": true,
```

-continued

```
    "enabled": false
},
"fcp": {
    "allowed": true,
    "enabled": false
},
"nvme": {
    "allowed": false,
    "enabled": false
},
"ndmp": {
    "allowed": true
},
"s3": {
```

-continued

```
    "enabled": false
},
"certificate": {
    "uuid": "99b6832b-9880-11ec-aa60-f39a9c7d278f"
},
"aggregates_delegated": true,
"retention_period": 12,
"max_volumes": "unlimited",
"anti_ransomware_default_volume_state": "disabled"
}
```

In some embodiments, the logical backup 812 of the storage virtual machine may be the following:

```
{'svm': {'aggregates': [{'block_storage': {'hybrid_cache': {'enabled': False},
                'mirror': {'enabled': False,
                        'state': 'unmirrored'},
                'plexes': [{'name': 'plex0'}],
                'primary': {'checksum_style': 'advanced_zoned',
                        'disk_class': 'virtual',
                        'disk_count': 1,
                        'disk_type': 'vm_disk',
                        'raid_size': 8,
                        'raid_type': 'raid0'}},
        'cloud_storage': {'attach_eligible': True},
        'create_time': '2022-02-28T10:22:18+00:00',
        'data_encryption': {'drive_protection_enabled': False,
                'software_encryption_enabled': False},
        'home_node': {'name': 'harmansiaws227202219914sn-vm',
                'uuid': '21c75a52-982b-11ec-aa60-f39a9c7d278f'},
        'inactive_data_reporting': {'enabled': False},
        'name': 'aggr2',
        'node': {'name': 'harmansiaws227202219914sn-vm',
                'uuid': '21c75a52-982b-11ec-aa60-f39a9c7d278f'},
        'snaplock_type': 'non_snaplock',
        'snapshot': {'files_total': 0,
                'files_used': 0,
                'max_files_available': 0,
                'max_files_used': 0},
        'space': {'block_storage': {'available': 95099207680,
                        'data_compacted_count': 0,
                        'data_compaction_space_saved': 0,
                        'data_compaction_space_saved_percent': 0,
                        'full_threshold_percent': 96,
                        'physical_used': 113291264,
                        'physical_used_percent': 0,
                        'size': 95104540672,
                        'used': 5332992,
                        'volume_deduplication_shared_count': 0,
                        'volume_deduplication_space_saved': 0,
        'volume_deduplication_space_saved_percent': 0},
                'cloud_storage': {'used': 0},
                'efficiency': {'logical_used': 0,
                    'ratio': 1,
                    'savings': 0},
                'efficiency_without_snapshots': {'logical_used': 0,
                            'ratio': 1,
                            'savings': 0},
                'efficiency_without_snapshots_flexclones':
        {'logical_used': 0,
                            'ratio': 1,
                            'savings': 0},
                'snapshot': {'available': 0,
                        'reserve_percent': 0,
                        'total': 0,
                        'used': 0,
                        'used_percent': 0}},
        'state': 'online',
        'uuid': '609c3f61-9167-4a49-8ae6-da2a7e034866'},
        {'block_storage': {'hybrid_cache': {'enabled': False},
                'mirror': {'enabled': False,
                        'state': 'unmirrored'},
                'plexes': [{'name': 'plex0'}],
                'primary': {'checksum_style': 'advanced_zoned',
                        'disk_class': 'virtual',
                        'disk_count': 1,
```

```
                    'disk_type': 'vm_disk',
                    'raid_size': 8,
                    'raid_type': 'raid0'}},
        'cloud_storage': {'attach_eligible': True},
        'create_time': '2022-02-28T10:22:08+00:00',
        'data_encryption': {'drive_protection_enabled': False,
                'software_encryption_enabled': False},
        'home_node': {'name': 'harmansiaws227202219914sn-vm',
                'uuid': '21c75a52-982b-11ec-aa60-f39a9c7d278f'},
        'inactive_data_reporting': {'enabled': False},
        'name': 'aggr1',
        'node': {'name': 'harmansiaws227202219914sn-vm',
            'uuid': '21c75a52-982b-11ec-aa60-f39a9c7d278f'},
        'snaplock_type': 'non_snaplock',
        'snapshot': {'files_total': 0,
                'files_used': 0,
                'max_files_available': 0,
                'max_files_used': 0},
        'space': {'block_storage': {'available': 94014365696,
                        'data_compacted_count': 0,
                        'data_compaction_space_saved': 0,
                        'data_compaction_space_saved_percent': 0,
                        'full_threshold_percent': 96,
                        'physical_used': 115298304,
                        'physical_used_percent': 0,
                        'size': 95104540672,
                        'used': 1090174976,
                        'volume_deduplication_shared_count': 0,
                        'volume_deduplication_space_saved': 0,
'volume_deduplication_space_saved_percent': 0},
            'cloud_storage': {'used': 0},
            'efficiency': {'logical_used': 679936,
                'ratio': 1,
                'savings': 0},
            'efficiency_without_snapshots': {'logical_used': 356352,
                        'ratio': 1,
                        'savings': 0},
            'efficiency_without_snapshots_flexclones':
{'logical_used': 356352,
                        'ratio': 1,
                        'savings': 0},
            'snapshot': {'available': 0,
                    'reserve_percent': 0,
                    'total': 0,
                    'used': 0,
                    'used_percent': 0}},
        'state': 'online',
        'uuid': 'ffa34488-1c69-412b-acdb-816880e0fec1'}],
    'aggregates_delegated': True,
    'anti_ransomware_default_volume_state': 'disabled',
    'certificate': {'uuid': '99b6832b-9880-11ec-aa60-f39a9c7d278f'},
    'cifs': {'allowed': True, 'enabled': False},
    'comment': '',
    'fcp': {'allowed': True, 'enabled': False},
    'ipspace': {'name': 'Default',
        'uuid': '965375c4-982b-11ec-aa60-f39a9c7d278f'},
    'iscsi': {'allowed': True, 'enabled': False},
    'language': 'c.utf_8',
    'ldap': {'enabled': False},
    'max_volumes': 'unlimited',
    'name': 'svm1',
    'ndmp': {'allowed': True},
    'nfs': {'allowed': True, 'enabled': False},
    'nis': {'enabled': False},
    'nsswitch': {'group': ['files'],
        'hosts': ['files', 'dns'],
        'namemap': ['files'],
        'netgroup': ['files'],
        'passwd': ['files']},
    'nvme': {'allowed': False, 'enabled': False},
    'resource_dependency': ['aggregates',
            'snapshot_policy',
            'ipspace',
            'nis'],
    'retention_period': 12,
    's3': {'enabled': False},
```

-continued

```
'snapshot_policy': {'copies': [{'count': 1,
        'prefix': '12-hourly',
        'schedule': {'name': '12-hourly',
            'uuid': '9e40cea0-982b-11ec-aa60-
f39a9c7d278f'},
        'snapmirror_label': '-'}],
    'enabled': True,
    'name': 'snap_policy1',
    'scope': 'cluster',
    'uuid': '76d8cadd-9880-11ec-aa60-f39a9c7d278f'},
'state': 'running',
'subtype': 'default',
'uuid': '96015513-9880-11ec-aa60-f39a9c7d278f'}}
```

During operation 406 of method 400, the backup orchestrator 516 transmits GET operations 524, targeting the REST API endpoints of the resources, to the remote object store 502. The GET operations 524 may utilize the IP address of the remote object store 502 and/or the credentials in order to obtain access to the REST API endpoints as targets of the GET operations 524. The GET operations 524 are performed in order to retrieve the resources (e.g., the primary resource and resources upon which the primary resource depends or is associated) and properties of the resources (e.g., a volume name, a volume size, volume ownership, volume access rights, and/or other dynamic properties). During operation 408 of method 400, the backup orchestrator 516 determine whether all resources and properties have been successfully retrieved from the remote object store 502 using the GET operations 524. If there are still more resources or properties to obtain, then the backup orchestrator 516 performs operation 406 for any remaining resources and/or properties of the resources. If any GET operations failed, then the GET operations 524 may be retried or an error may be returned for the backup request.

In some embodiments, this may be a superset of the information retrieved by performing the previous GET operation to the storage virtual machine. In this case, GET operations are repeatedly performed on all dependencies on the storage virtual machine to the deployed instance of the storage virtual machine to gather information used to replicate these settings (configuration parameters). In some embodiments where there is a dependency with an aggregate resource, the obtained information from the GET operations and/or the specification 808 may provide an indication as to the functionality of code associated with the aggregate resource. An API request (e.g., a client for URL (CURL) request) may return UUIDs for each of the aggregates of the storage virtual machine. These UUIDs are used to uniquely identify resources. Since the storage virtual machine may have multiple aggregate resources, several sequential GET operations are made to a storage operation system instance in the remote object store to obtain more data about each of these aggregate resources. The additional data, such as metadata, may be saved by expanding an existing structure used to store such data (e.g., the dependency graph 810 or the logical backup 812). Creating the dependency graph 810 may be an extensive task. Thus, information about the relative dependencies in the dependency graph 810 are saved within the logical backup 812 to make the restore operation more efficient because the dependency graph 810 does not need to be regenerated during restoration.

The backup restorer module 806 takes the logical backup 812 as input. The backup restorer module 806 parses the logical backup 812 and the specification 808. The specification 808 provides the API endpoints and necessary parameters for POST operations that will be performed during restoration to the remote object store. The logical backup 812 provides values for these parameters (e.g., values of configuration parameters of a resource, such as a size, name, and path of a volume). In this way, the values from the logical backup 812 and the parameters from the specification 808 are used to generate and issue POST operations targeting the API endpoints identified from the specification 808. The POST operations are issued starting from a smallest resource (component) and building up to a target resource being restored.

In some embodiments, an output while restoring the storage virtual machine may be:

```
Reading JSON file: ./Files/swagger.json
Reading JSON file: ./Logical Backup/logical_backup.json
Parsing API endpoints in YAML File
Looking for params for snapshot_policy
Looking for params for ipspace
Looking for params for aggregate
Looking for params for nis
Parameters for POST requests parsed from logical backup
Restoring backup...
POST: "/api/storage/aggregate"
Waiting Job completion. Next ping in 2 seconds
Waiting Job completion. Next ping in 2 seconds
Job complete
aggr1 created on node ip 172.30.0.158
POST: "/api/storage/aggregate"
Waiting Job completion. Next ping in 2 seconds
Job complete
aggr2 created on node ip 172.30.0.158
POST: "/storage/snapshot-policies"
Waiting Job completion. Next ping in 2 seconds
Job complete
snap_policy1 created on node ip 172.30.0.158
POST: "/api/svm/svms"
Waiting Job completion. Next ping in 2 seconds
Job complete
svm1 created on node ip 172.30.0.158
```

In some embodiments, at least some of the exemplary method 400 of FIG. 4 and/or at least some of the exemplary method 600 of FIG. 6 may be implemented by a data processing system, such as a computing device, a serverless thread, a server, a client device, a node, hardware or software of a remote object store, a container of a container orchestration platform (e.g., Kubernetes), etc.

Figure 9:
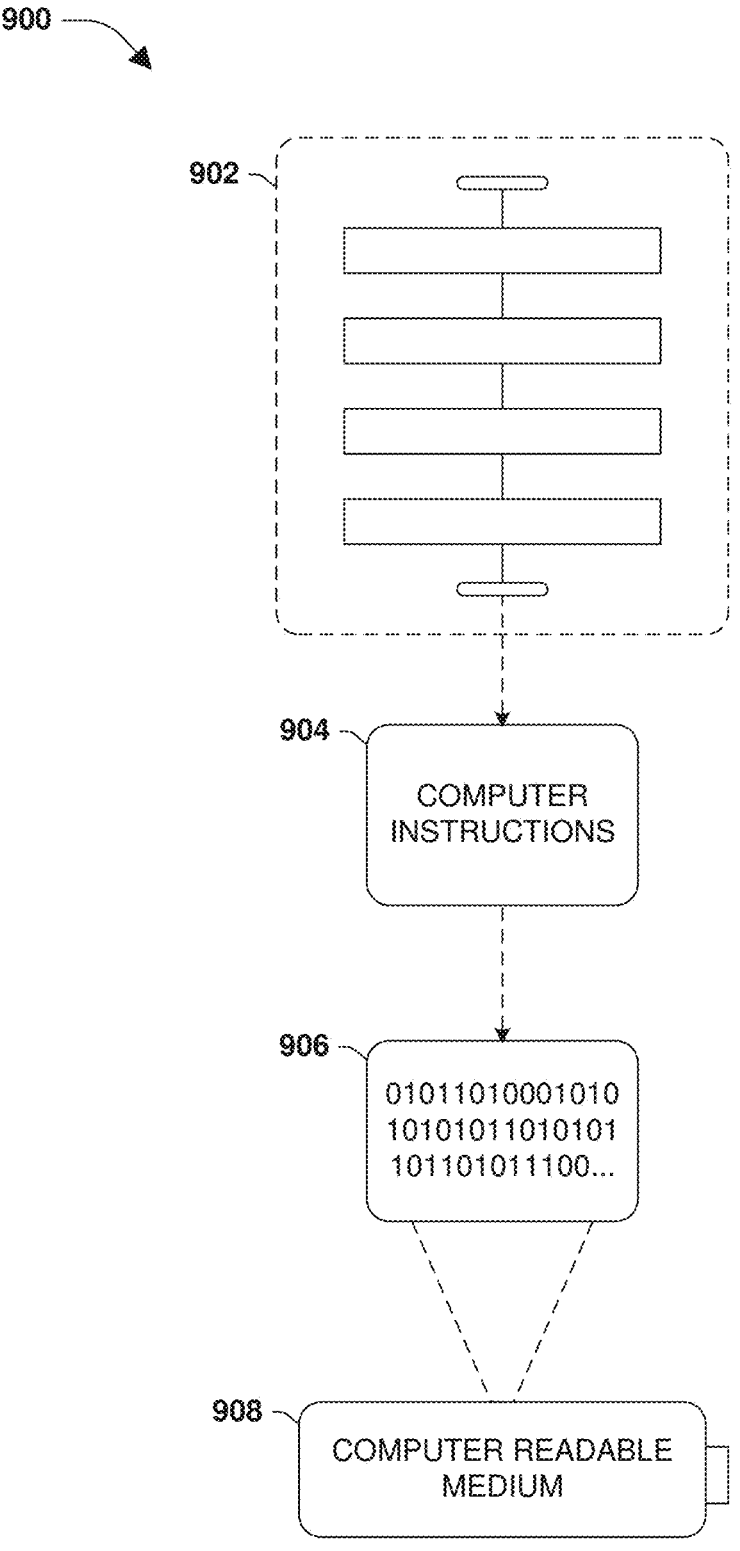
FIG. 9 is an example of a computer readable medium in which an embodiment of the present technology may be implemented.

FIG. 9 is an example of a computer readable medium in which an embodiment of the present technology may be implemented. An example embodiment of a computer-readable medium or a computer-readable device that is devised in these ways is illustrated in FIG. 9, wherein the implementation comprises a computer-readable medium 908, such as a compact disc-recordable (CD-R), a digital versatile disc-recordable (DVD-R), flash drive, a platter of a hard disk drive, etc., on which is encoded computer-readable data 906. This computer-readable data 906, such as binary data comprising at least one of a zero or a one, in turn comprises processor-executable computer instructions 904 configured to operate according to one or more of the principles set forth herein. In some embodiments, the processor-executable computer instructions 904 are configured to perform a method 902, such as at least some of the exemplary method 400 of FIG. 4 and/or at least some of the exemplary method 600 of FIG. 6, for example. In some embodiments, the processor-executable computer instructions 904 are configured to implement a system, such as at least some of the exemplary system 500 of FIG. 5 and/or at least some of the exemplary system 700 of FIG. 7, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (Saas) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method executed by a data processing system, comprising:
identifying links between resources of a virtual machine or file system hosted within a remote object store, wherein a link from a first resource to a second resource indicates that the first resource has a dependency upon the second resource;
creating a backup that includes a dependency graph to represent the resources as nodes,
wherein the nodes are connected based upon dependency information extracted from the links,
wherein the dependency graph specifies that the first resource is to be restored before the second resource based upon the second resource depending upon the first resource, and
wherein a resource represented by a node is dependent upon resources represented by nodes downstream of the node within the dependency graph;
restoring the resources to a destination remote object store using the dependency graph within the backup to restore the resources according to an order that preserves dependencies between the resources, wherein the restoring includes:
in response to determining that a specification defines the resource as not being read only, restoring the resource to the destination remote object store; and
in response to determining that the specification defines the resource as being read only, skipping the resource for restoration to the destination remote object store.

2. The method of claim 1, wherein the restoring comprises:
determining that a local resource is to be used as a substitute for restoring a target resource based upon a determination that the local resource is located within the destination remote object store;
performing a first operation to an endpoint within the destination remote object store for the local resource to obtain an identifier of the local resource; and
performing a second operation for a primary resource to reference the local resource using the identifier.

3. The method of claim 1, comprising:
parsing the specification to identify the resources and endpoints of the resources within the remote object store.

4. The method of claim 3, comprising:
transmitting retrieve operations targeting the endpoints of the resources to retrieve the resources and properties of the resources.

5. The method of claim 1, comprising:
generating the backup of a primary resource to include the resources and properties of the resources, wherein the resources are structured within the backup according to the dependencies represented by the dependency graph.

6. The method of claim 5, comprising:
evaluating the specification to identify supported operations for the resources; and
providing an indication, within the backup, that the resource either supports a first type of operation or a second type of operation for restoring the resource.

7. The method of claim 1, comprising:
receiving a request to restore a primary resource that includes the resources;
parsing the backup of the resources to identify properties of a first set of resources that include the primary resource and a second set of resources that reference or recursively depend from the primary resource; and
restoring the primary resource utilizing operations to restore the first set of resources and the properties of the first set of resources to application programming interface (API) endpoints.

8. The method of claim 7, comprising:
identifying the second set of resources that reference or recursively depend from the primary resource based upon the a second set of resources corresponding to API endpoints that are under the primary resource in a uniform resource identifier.

9. The method of claim 7, comprising:
recreating the primary resource as a cloned instance of the primary resource at the remote object store, wherein the primary resource and the cloned instance of the primary resource are concurrently hosted within the remote object store.

10. The method of claim 7, comprising:
restoring the primary resource to a prior state represented by the backup, wherein current parameters of the primary resource are overwritten by backed up parameters within the backup.

11. The method of claim 7, comprising:
in response to a first resource of the first set of resources supporting a POST operation, restoring the resource to a API endpoint using the POST operation.

12. The method of claim 11, comprising:
in response to the first resource not supporting the POST operation, restoring the resource to the API endpoint using a PATCH operation.

13. A computing device comprising:
a memory including machine executable code; and
a processor coupled to the memory, the processor configured to execute the machine executable code to cause the computing device to:
identify links between resources of a virtual machine or file system hosted within a remote object store, wherein the links indicate resource dependency;
create a backup that includes a dependency graph to represent the resources as nodes,
wherein the nodes are connected in the dependency graph based upon resource dependency information extracted from the links, and wherein the dependency graph indicates an ordered restoration of resources; and execute a restore operation to restore the resources to a destination remote object store using the dependency graph according to an order that preserves dependencies between the resources, wherein the restore operation includes:

determining that a local resource is to be used as a substitute for restoring a resource;

retrieving an identifier of the local resource from an endpoint within the destination remote object store; and referencing the local resource using the identifier as part of performing an operation for the primary resource to reference the local identifier.

14. The computing device of claim 13, wherein the machine executable code causes the machine to:

utilize the dependency graph to restore the resources according to the order determined based upon the dependencies represented by the dependency graph.

15. The computing device of claim 13, wherein the machine executable code causes the machine to:

parse a specification to identify the resources and endpoints of the resources within the remote object store.

16. The computing device of claim 15, wherein the machine executable code causes the machine to:

determining that the local resource is to be used as the substitute for restoring the resource based upon a determination that the local resource is located within the destination remote object store.

17. The computing device of claim 13, wherein the machine executable code causes the machine to:

generate the backup of the primary resource to include the resources and properties of the resources, wherein the resources are structured within the backup according to the dependencies represented by the dependency graph.

18. The computing device of claim 17, wherein the machine executable code causes the machine to:

evaluate a specification to identify supported operations for the resources; and provide an indication, within the backup, that the resource either supports a first type of operation or a second type of operation for restoring the resource.

19. A non-transitory machine readable medium comprising instructions, which when executed by a machine, causes the machine to:

identify dependencies between resources of a virtual machine or file system hosted within a remote object store;

create a backup to include a dependency graph to represent the resources as nodes, wherein the nodes are connected based upon the dependencies, wherein the dependency graph specifies an order with which the resources are to be restored based upon the dependencies, wherein the backup is created to include an indication as to whether a first resource being backed up supports a first operation type, and wherein a second resource is excluded from the backup based upon the second resource not supporting the first operation type; and utilize the dependency graph to restore the resources according to the order, wherein for the resource:

in response to the indication specifying that the resource supports the first operation type, construct and execute a restore operation having the first operation type to restore the resource.

20. The non-transitory machine readable medium of claim 19, wherein the instructions cause the machine to:

generate the backup to include the resources and properties of the resources, wherein the resources are structured within the backup according to the dependencies represented by the dependency graph.

* * * * *